July 20, 1965  R. E. HARTSOCK  3,196,223
SELECTOR SWITCH WITH SCANNING MOTION TRANSLATION MEANS
Filed Dec. 6, 1960  6 Sheets-Sheet 1

INVENTOR
Robert E. Hartsock
BY J. Hanson Boyden,
ATTORNEY

July 20, 1965  R. E. HARTSOCK  3,196,223
SELECTOR SWITCH WITH SCANNING MOTION TRANSLATION MEANS
Filed Dec. 6, 1960  6 Sheets-Sheet 2

INVENTOR
Robert E. Hartsock

BY *J. Hanson Boyden*,

ATTORNEY

July 20, 1965 R. E. HARTSOCK 3,196,223
SELECTOR SWITCH WITH SCANNING MOTION TRANSLATION MEANS
Filed Dec. 6, 1960 6 Sheets-Sheet 3

INVENTOR
Robert E. Hartsock
BY J. Hanson Boyden,
ATTORNEY

July 20, 1965  R. E. HARTSOCK  3,196,223
SELECTOR SWITCH WITH SCANNING MOTION TRANSLATION MEANS
Filed Dec. 6, 1960  6 Sheets-Sheet 4

INVENTOR
Robert E. Hartsock

BY *J. Hanson Boyden,*

ATTORNEY

July 20, 1965
R. E. HARTSOCK
3,196,223
SELECTOR SWITCH WITH SCANNING MOTION TRANSLATION MEANS
Filed Dec. 6, 1960
6 Sheets-Sheet 5
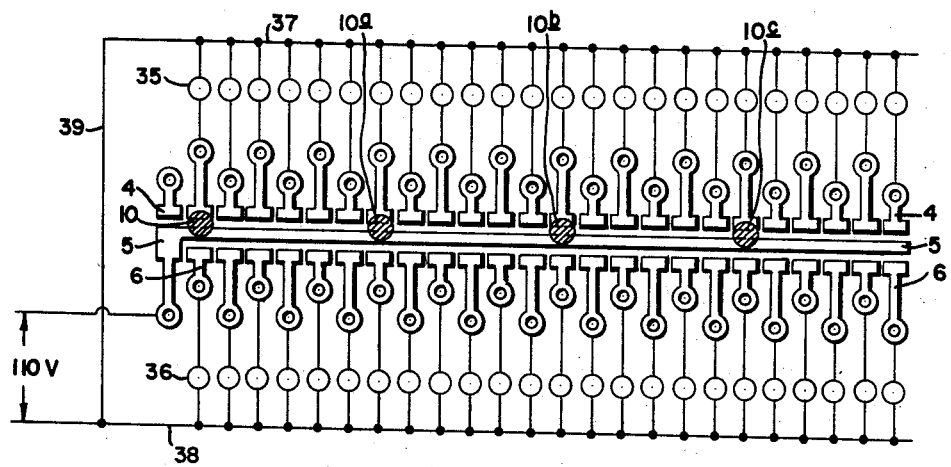
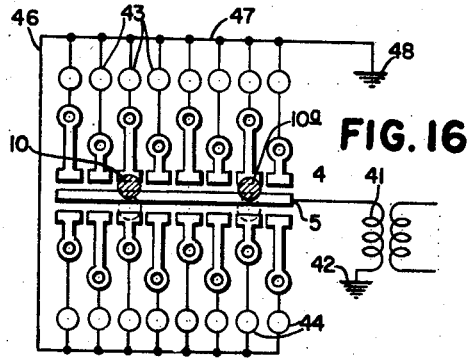
FIG. 15.
FIG. 16a.
FIG. 16b.
FIG. 21.
FIG. 22.
FIG. 23.
INVENTOR
Robert E. Hartsock
BY J. Hanson Boyden
ATTORNEY July 20, 1965 R. E. HARTSOCK 3,196,223
SELECTOR SWITCH WITH SCANNING MOTION TRANSLATION MEANS
Filed Dec. 6, 1960 6 Sheets-Sheet 6
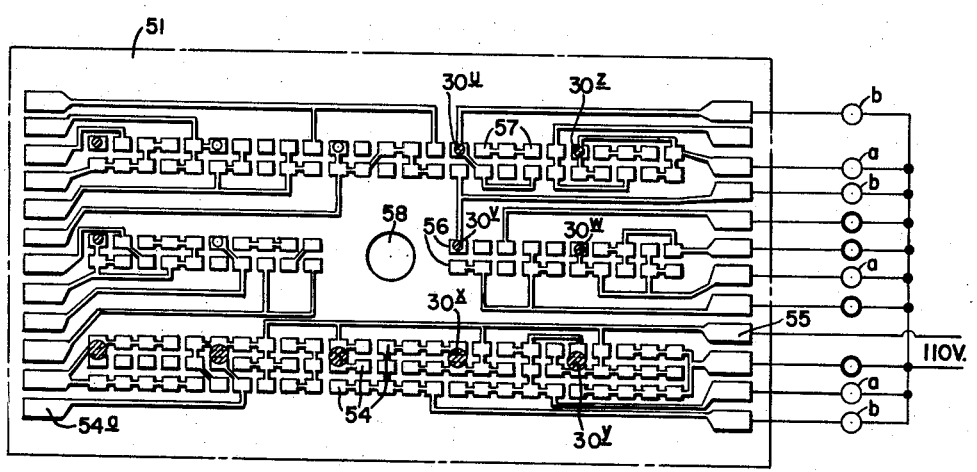
FIG.17.
FIG.18.
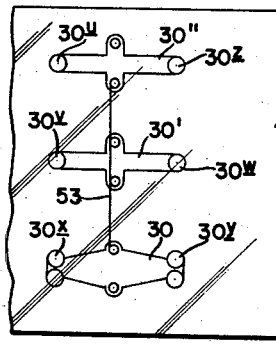
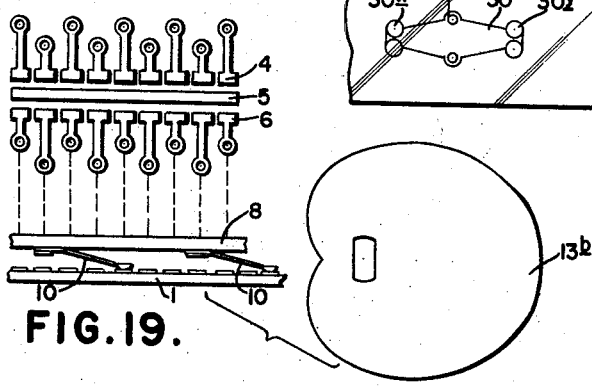
FIG.19.
FIG.20.
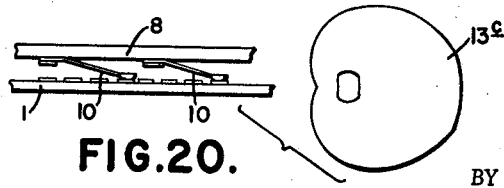
FIG.24.
FIG.25.
FIG.26.
FIG.27.
INVENTOR
Robert E. Hartsock
BY J. Hanson Boyden
ATTORNEY

United States Patent Office 3,196,223
Patented July 20, 1965

3,196,223
SELECTOR SWITCH WITH SCANNING MOTION
TRANSLATION MEANS
Robert E. Hartsock, 2025 Deep Canyon Road,
La Habra, Calif.
Filed Dec. 6, 1960, Ser. No. 74,097
10 Claims. (Cl. 200—16)

This invention relates to electrical switching devices, and more particularly to selector switches.

One of the problems of manufacturers of selector switches has been the necessity for designing and building a completely new and special switch to meet the particular requirements of each different customer or application. This made the cost of constructing such special switches undesirably high.

In its broader aspects, one of the important objects of the invention is to provide a new approach to the problem of supplying special designs of switches to meet the different requirements of particular applications. To this end, the invention contemplates the manufacture of generally standard switch parts which may be selected and assembled, with slight modification in some cases, so as to provide switching arrangements and circuitry of many different kinds.

More specifically, the invention is directed to a selector switch comprising a rigid board or support carrying one or more series of fixed contacts, and a plate movable parallel with said support and carrying one or more movable spring contacts positioned to engage the fixed contacts. The invention contemplates constructing the board or support in the form of a strip of one or more standard widths and of indefinite length, and cutting off from such a strip of selected width a section of the necessary length to form a switch for any desired application. Similarly, the invention contemplates constructing the plate in the form of a strip of standard width and indefinite length, such strip having one or more rows of uniformly spaced pairs of holes extending continuously throughout the length of the strip, and cutting from such strip a section of the required size to co-operate with the above-mentioned section of the board or support. Then one or more spring contacts can be mounted, as by riveting, in any desired pairs of holes in any selected positions.

Thus, by fabricating standard strips, and cutting from such strips boards and plates of the required size, and mounting on such plates any desired number of spring contacts in any desired positions, selector switches may be produced adapted for the different requirements of many particular applications, and the cost of production of such switches will be far less than by the old method of specially designing each endividual switch.

Another object of the invention, as embodied in a switch of the above-mentioned type, namely, comprising a board or support carrying one or more series of parallel rows of fixed contacts and a plate carrying one or more movable spring contacts, is to devise means for moving the plate and spring contact or contacts in a rectangular path, whereby each spring contact travels longitudinally over one row of fixed contacts in one direction, then shifts laterally, and travels longitudinally over another row of fixed contacts in the opposite direction. This results in an efficient, compact arrangement in which the same number of fixed contacts take up only half as much space, longitudinally of the board, as they would if disposed in a single row, so that, for a given number of contacts, a substantially shorter length of board is required.

A still further object of the invention is to provide, in a switch of the above-mentioned type, a board or support having thereon two parallel rows of fixed contacts or conducting elements spaced apart, with a common conducting strip between them, in combination with a movable spring contact constructed to bridge or span one row of fixed contacts and the common conducting strip, and means for shifting such movable contact laterally so as to cause it to selectively engage and bridge either row of fixed contacts and the common strip.

Yet another object of the invention is to devise a basic or universal fixed contact arrangement which can be used for a large number of different pole and position combinations.

A still further over-all object is to provide a basic switch construction that can be adapted to meet the requirements of a wide variety of electrical circuitry with a minimum of changes, and with a minimum of complexity in design and manufacture.

The first of the above-mentioned objects, and also the last two, are achievable only by the use of the rectangular path of travel, previously referred to. The outstanding features of this rectangular path are that it provides a cyclical movement which is expandable without basic change to produce switches with different numbers of positions.

Such an arrangement, with the fixed contacts and common conducting strip disposed in straight, parallel rows, presents marked advantages over the conventional rotary switches, and over the type of switch covered by my own previous Patent No. 2,810,759 issued October 22, 1957. In these prior switches, where the fixed contacts are disposed in circular arcs, entire re-arrangement of the contact circles is required in order to obtain a different number of positions. Moreover, in such prior rotary switches, much space on the supporting board or panel is lost in the open centers of the circular series of contacts, while in the present invention the space on the board is utilized much more efficiently. There are no blank areas.

With the above and other objects in view, and to improve generally on the details of such switches, the invention consists in the construction, combination and arrangement of parts hereinafter described and claimed, and illustrated in the accompanying drawings, forming part of this specification, and in which:

FIG. 15 is a diagram illustrating the basic pattern of contacts employed in the invention and also showing typical external circuits controlled by these contacts;

FIGS. 16A and 16B are also circuit diagrams illustrating other possible arrangements of contacts and circuits falling within the scope of the invention;

FIG. 17 is likewise a diagram illustrating still another arrangement of contacts and circuits which may be employed;

FIG. 18 is a fragmentary plan view of a scanning plate having movable contacts adapted to cooperate with those shown in FIG. 17;

FIGS. 19 and 20 are diagrammatic views illustrating different arrangements of contacts and actuating mechanism;

FIGS. 21, 22 and 23 are perspective views on an enlarged scale showing different types of movable contacts which I may employ; and FIGS. 24, 25, 26 and 27 are diagrams illustrating different paths of movement which the scanning plate and movable contacts may follow.

Figure 5:
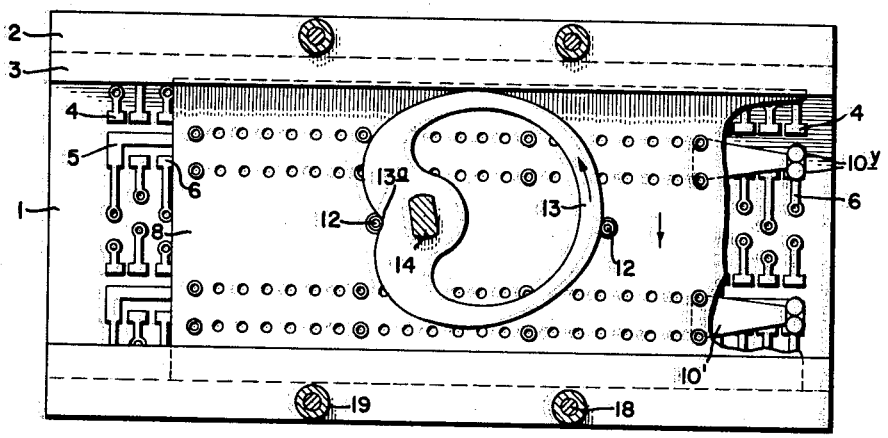
Figure 6:
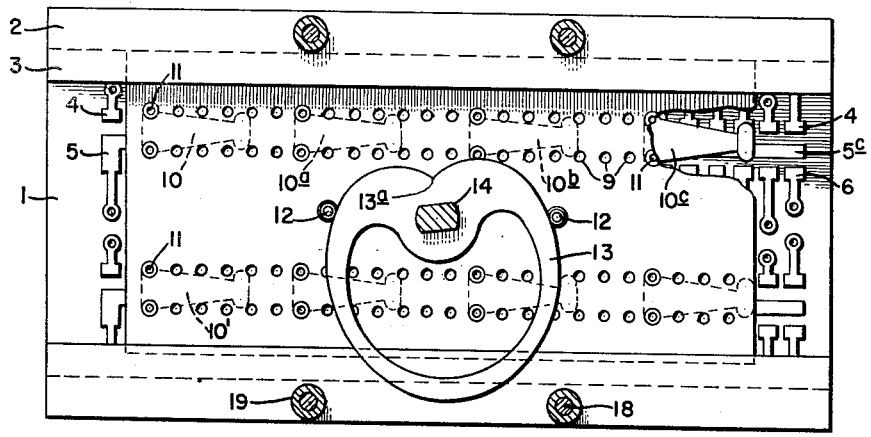
Figure 7:
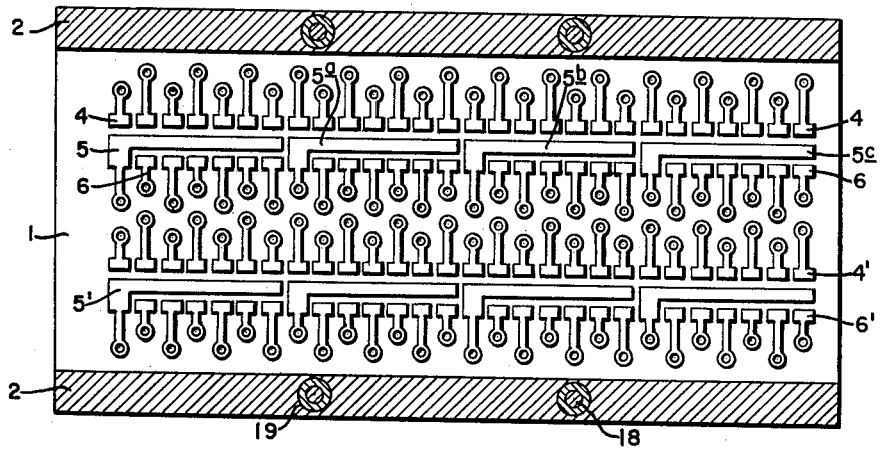
FIG. 7 is a horizontal section substantially on the line 7—7 of FIG. 2.

Referring to the dawings in detail and first to FIGS. 1–7 thereof illustrating a practical and efficient embodiment of the invention, 1 designates a rigid, rectangular board, panel or support formed of insulating material. At the longitudinal edges of this board or panel are mounted guide rails 2 having inwardly projecting horizontal flanges 3. On the board or support 1, as perhaps best illustrated in FIG. 7, are a plurality of groups of conducting elements, each group comprising a plurality of parallel rows extending lengthwise of the panel or support. Each of these groups consists of two rows of individual fixed contacts 4 and 6 and 4' and 6', spaced apart a uniform distance. Between each pair of rows of these separate fixed contacts extends a common conductor strip 5 or 5'. These conductor strips may be continuous or they may be divided into several sections, four of such sections being illustrated in FIG. 7 and designated at 5, 5$^a$, 5$^b$ and 5$^c$. Both the individual contacts and the common conducting strips are joined to terminals 7 which extend through the board or panel for the connection of the outside circuitry, in a well-known manner.

The contacts and conducting strips such as shown in FIG. 7 may be advantageously applied to the board or panel by printed circuit technique.

Figure 3:
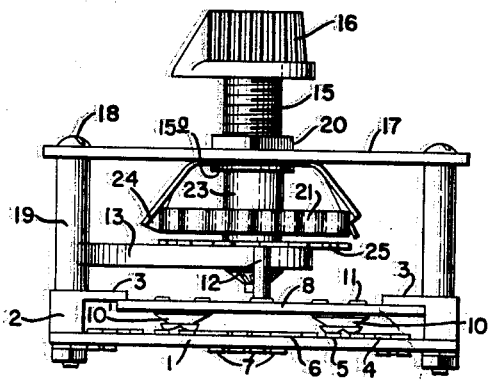
FIG. 3 is an end elevation of the device shown in FIG. 1.

Mounted for movement in a plane parallel with that of the board or panel 1, and spaced therefrom, is a plate 8 of insulating material, which I shall refer to as a "scanning plate." This plate is confined under the overhanging horizontal flanges 3 of the guide rails 2, as best shown in FIG. 3, and from this figure it will be noted that the width of the scanning plate 8 is substantially less than the distance between the guide rails 2. This is for a purpose hereinafter more fully described.

The scanning plate 8 has two parallel rows of uniformly spaced pairs of holes or perforations 9, these rows extending throughout the length of the plate and being spaced apart a distance comparable to the spacing of the common conductor strips 5 and 5'.

Figure 2:
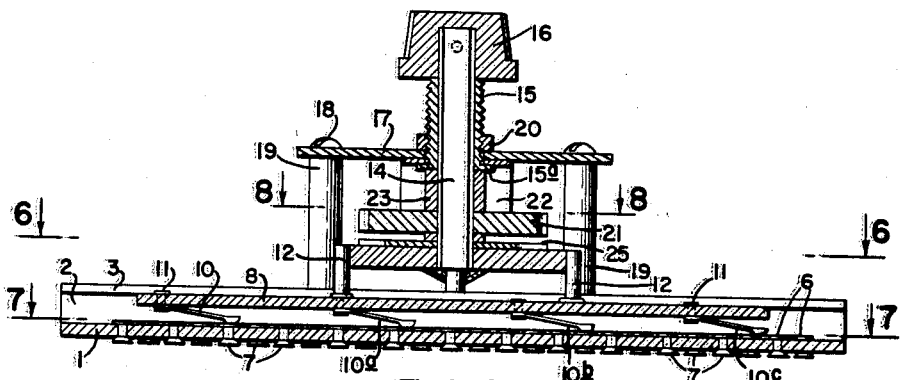
FIG. 2 is a vertical section on the line 2—2 of FIG. 1, looking in the direction of the arrows.

Interposed between the panel or support 1 and the scanning plate 8, and secured to the under side of the latter as by means of rivets or eyelets 11 passing through selected pairs of holes 9 are a plurality of movable spring contacts 10 constructed to engage the fixed contacts 4, 5 and 6. The resilience of these contacts 10 insures good electrical connection with the fixed contacts, and also urges the plate 8 against the under side of the flanges 3 of the guide rails 2. Thus the spring contacts tend to move the plate 8 away from the support or panel 1 and this movement is limited by the engagement of the plate with the flanges 3. As illustrated in FIGS. 2, 6 and 7, there are secured to selected pairs of holes in each row four of these spring contacts 10, 10$^a$, 10$^b$ and 10$^c$. Each of these contacts engages one of the sections of the common conducting strips shown in FIG. 7. In other words, since there are four such sections illustrated in FIG. 7, four spring contacts are mounted in each row on the scanning plate, so that as the scanning plate moves longitudinally, as hereinafter described, the four spring contacts simultaneously travel over the four sections of the common conductor strip. Thus, a plurality of groups of circuits can be simultaneously controlled.

Referring now to FIG. 22, there is illustrated in detail one of the typical spring contacts 10 above referred to. It will be seen that each of these contacts has at its free end a pair of lobes 10$^y$, disposed side by side, and connected with the body of the contact by means of a relatively narrow neck 10$^x$. At its other end, the contact has a flat portion 10$^c$ having holes or notches adapted to receive the rivets or eyelets by which the contact is mounted on the scanning plate.

Figure 4:
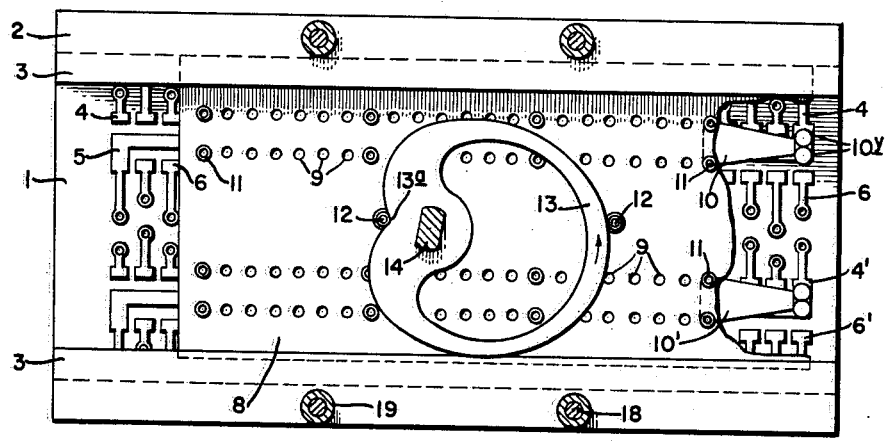
FIGS. 4, 5 and 6 are similar horizontal sections taken substantially on the line 6—6 of FIG. 2, and showing the parts in different positions.

By referring particularly to FIGS. 3 and 4, it will be seen that this transversey disposed pair of lobes spans or bridges one row of contacts such as 4 or 6 and the intervening common conductor 5, thus establishing an electrical circuit between the common conductors strip and any one of the selected fixed contacts 4 or 6 with which the movable contact 10 selectively engages.

The function of the narrow neck 10$^x$ is to reduce the torsional stiffness of the contact so as to allow both lobes to effectively engage the fixed contacts, even if these fixed contacts do not all lie in precisely the same plane.

Set into and projecting up from the scanning plate 8 are a pair of follower pins 12 spaced apart a substantial distance longitudinally of the plate. Arranged to cooperate with these pins and fitting snugly between them is a constant width cam 13 of the cardioid type, rigidly mounted on a shaft 14 extending at right angles to the plate and board or panel. This shaft is rotatably mounted in a bushing 15 passing through an opening in a frame 17 and carrying at its upper end a knob 16 by which it may be turned. This frame 17 is supported at a substantial distance above the board or panel by means of four sleeves 19 through which pass screws or bolts into and through the guide rails 2, as clearly shown in FIG. 3. At its lower end, the bushing 15 has an outturned annular flange 15$^a$ and clamped between this flange and the frame 17, by means of a nut 20, is an inverted U-shaped spring detent 22. This detent has at diametrically opposite points inwardy projecting portions 24 (see FIG. 8) adapted to snap into and out of notches in the edge of a disc 21 secured to the shaft 14. This detent mechanism serves to yieldingly hold the scanning plate 8 in successive positions as the shaft is turned step by step. A lug 24$^a$ is formed on the end of the spring detent 22 adjacent one of the projections 24, and extends slightly beyond such end, as shown in FIG. 9, for a purpose described later. A spacing sleeve 23 is interposed between the flange 15$^a$ and the disc 21. Also secured to the shaft 14 at a point adjacent the notched disc 21 is a star wheel 25, the purpose of which will be hereinafter described.

It will now be understood that as the shaft 14 is turned the cam 13, engaging the follower pins 12, imparts a special novel motion to the scanning plate 8. FIG. 4 shows the cam in a position where the scanning plate is at the extreme right-hand end of its travel and the pair of lobes 10$^y$ at the end of each movable spring contact engages the common conductor strip 5 or 5' and the last of the individual fixed contacts 4 or 4'. As the cardioid cam is turned counterclockwise in the direction of the arrow, the notch 13$^a$, engaging the adjacent pin 12, tends to turn or rotate the scanning plate, but this rotation is restrained by the guide rails 2, and, the space between the guide rails being greater than the width of the plate, the result is that the plate is suddenly shifted laterally, or downwardly, in the direction of the arrow, as viewed in FIG. 5, thus causing the movable contact lobes 10$^y$ to engage the common conductor strip 5 and the lower row of individual fixed contacts 6 and 6'.

Upon further movement of the cam in the same direction, the spring contacts progress toward the left with a rectilinear movement.

Figure 1:
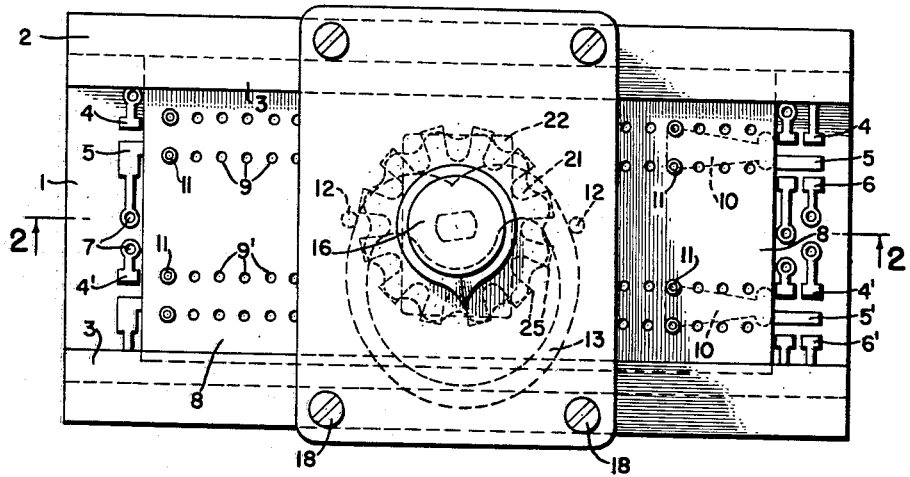
FIG. 1 is a plan view of one specific embodiment of the invention.

FIG. 6 shows the parts in the same position in which they appear in FIG. 1, with the spring contacts engaging the upper rows of fixed contacts.

FIG. 24 illustrates the path of the scanning plate and each individual spring contact as the cam completes one revolution. It will be seen that this path is a rectangular one. The plate first travels along one side of the rectangle for somewhat less than half a revolution, then shifts across the end of the rectangle as the notch 13ª of the cam engages one of the pins 12, then as the cam continues to turn in the same direction, the plate travels along the other side of the rectangle in the opposite direction, and finally when the notch in the cam engages the other pin the plate is shifted laterally across the end of the rectangle to its starting position. It will be particularly observed that this lateral shifting takes place at each half revolution of the cam, while the shaft is turning continuously in the same direction, and that the plate moves in one direction during nearly one half of a revolution and in the opposite direction during nearly the other half. The shaft must turn through an angle equal to one switch position to effect the lateral shift of the scanning plate as described, this angle, in a 12-position switch, being 30°. Hence the plate travels longitudinally in each direction along a side of its rectangular path during a half revolution minus the above mentioned angle, that is to say, in a 12-position switch, during rotation of the shaft through 180° minus 30°, or 150°.

Although the drawings illustrate the shaft 14 as being manually operated by means of a knob 16, it will be understood that, in many applications, such, for example, as talking signs, the shaft 14 would be motor driven and would operate continuously.

If, for any reason, when the shaft is manually operated, it is desired to confine the path of travel of the scanning plate to less than a complete rectangle, the travel of the plate may be stopped at any desired point by means of the stop disc or star wheel 25. As shown in FIG. 9, it is only necessary to bend over the end of any desired one of the arms of the star wheel so that it will engage the lug on the spring detent 22, and be stopped at the particular point. When one of the bent arms thus engages this lug, further rotation of the shaft will be interrupted. Thus, by bending up two of the arms, suitably spaced, it is possible to stop the rotation after the plate has travelled over the two sides and one end of its rectangular path, thus producing a U-shaped path, as illustrated in FIG. 25. By setting the selected stop arms with some other spacing, it is possible to interrupt the travel after one side, one end and only a part of the other side of the rectilinear path have been traversed, thus producing a J-shaped path, as illustrated in FIG. 26. By selecting still different spacing, it is possible to stop the plate after any desired portion of the path has been traversed.

Figure 10:
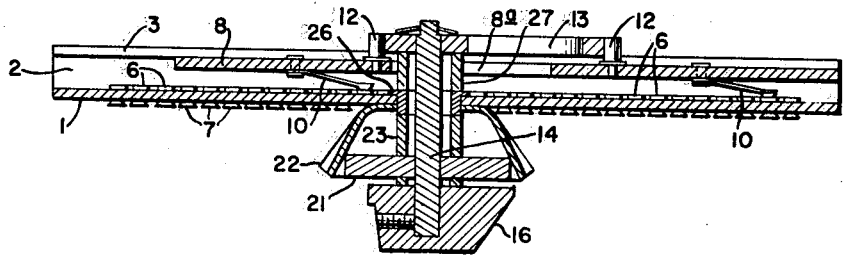
FIG. 10 is a similar vertical section showing a modification of the invention slightly different from that illustrated in FIGS. 1–7.

While in FIGS. 1–3 I have shown the operating shaft 14 as extending up above the scanning plate and supported by a frame 17, I also contemplate the possibility of having the shaft extend down through the scanning plate, as illustrated in FIG. 10, thus eliminating the necessity for any frame such as 17. In this case, as shown in FIG. 10, an aperture is formed in the support 1 for the passage of the shaft and an elongated opening 8ª has to be formed in the plate 8' to clear the shaft as the plate reciprocates.

FIGS. 9 and 10 are substantially the same in this respect, except that in FIG. 10 the star wheel 25, shown in FIG. 9, is not illustrated, but may, of course, be used.

While in FIGS. 1–3 I have illustrated the spring detent 22 as held in fixed position by means of a clamping nut 20, in FIGS. 9 and 10 I have employed a different method of mounting this spring detent. In these figures, I employ a sleeve 26 over the end of which an aperture in the spring detent 22 is forced with a press fit. In these figures also a spacing sleeve 23 is employed between the arms of the spring detent 22, and in FIG. 10 another spacing sleeve 27 is interposed between the cam and the board or support 1. FIGS. 2, 9 and 10 illustrate three of many ways in which these details can be constructed.

Figure 11:
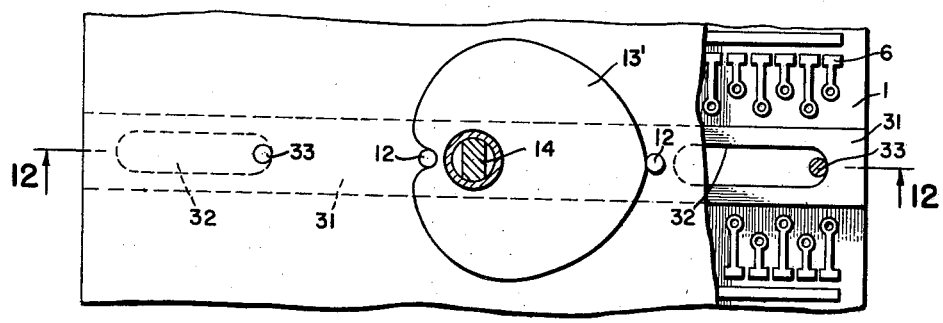
FIG. 11 is a fragmentary plan view somewhat similar to FIG. 4 but showing another modified form of the invention.
Figure 12:
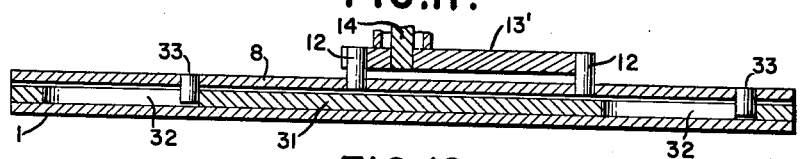
FIG. 12 is a vertical section substantially on the line 12—12 of FIG. 11.

Although I have referred to the path of travel of the scanning plate as rectangular, I may, if desired, employ a construction in which the path comprises two long parallel portions united at their ends by arcuate portions. This may be accomplished in the manner shown by way of example in FIGS. 11 and 12. In these figures, I secure to the board or support 1 a bar 31, extending longitudinally thereof and having at either side of the cam 13' an elongated slot 32 with rounded ends. In addition to the follower pins 12, the scanning plate 8 has secured thereto a pair of downwardly extending pins 33 which work freely in the slots 32. It will thus be obvious that, as the cam rotates, the slots 32 and pins 33 act as guides to cause the scanning plate to follow the path illustrated in FIG. 27.

Figure 13:
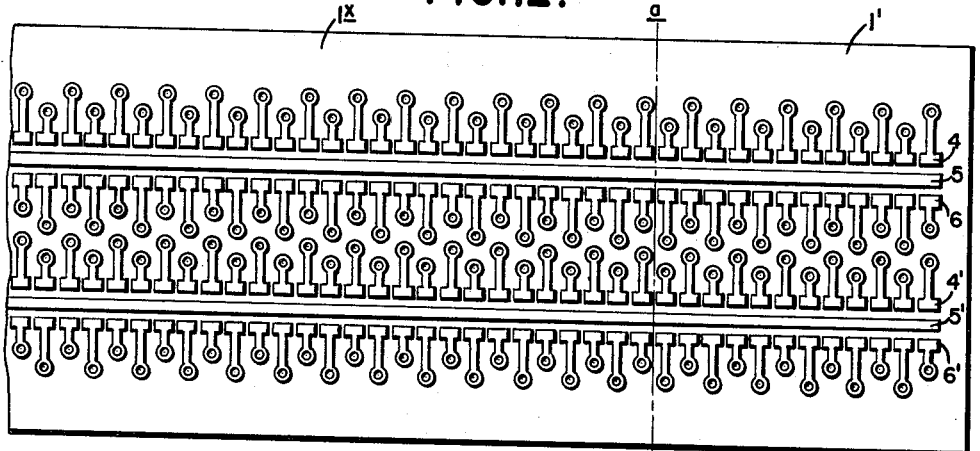
FIG. 13 is a plan view of a standard strip formation carrying a plurality of parallel rows of contacts, from which strip a section of suitable size may be cut to form the board or supporting panel of a desired switch.
Figure 14:
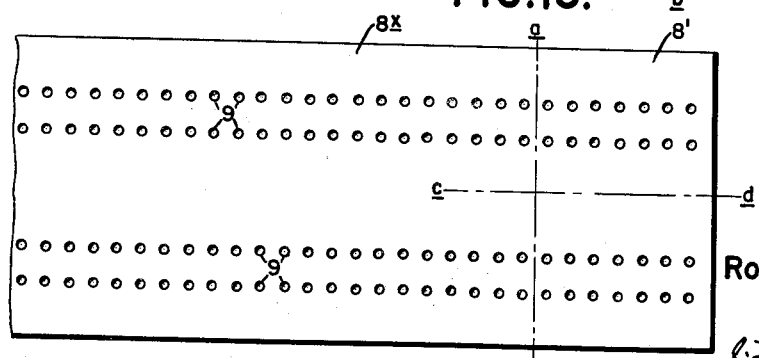
FIG. 14 is a similar plan view showing a strip having a plurality of rows of pairs of holes extending throughout the length thereof, from which strip a section may be cut to form a scanning plate of any desired size.

In FIGS. 13 and 14, I have attempted to illustrate one of the fundamental features of novelty of the invention, as set forth in the preamble. As illustrated in FIG. 13, I prepare a stock strip $1^x$ of rigid insulating material of standard or any desired width and of indefinite length. On this strip, I provide, as by means of printed circuit technique, one or more groups of fixed contacts, two of such groups being shown, each group comprising a common conductor strip such as 5 and parallel rows of individual contacts spaced from this strip and from each other, one row on each side of the strip.

As illustrated in FIG. 14, I provide a second stock strip $8^x$ of rigid insulating material, this strip having formed therein one or more parallel rows of pairs of perforations 9, uniformly spaced and extending throughout the length thereof.

To form a selector switch for any desired application, I cut from the strip $1^x$ of FIG. 13, as indicated by the line $a$–$b$, a section 1' of a length necessary to meet the requirements, and I then cut from the strip $8^x$ of FIG. 14 a section 8' of corresponding length, as indicated by the line $a$–$b$. These two sections can then be assembled, as illustrated in FIGS. 1–3, to form a complete switch, it being understood that any desired number of spring contacts such as 10 may be mounted in any desired pairs of holes 9 in the section 8'. I further contemplate cutting the strip $8^x$ longitudinally, as indicated by the line $c$–$d$, to form a scanning plate having only one row of pairs of perforations, if desired for any particular application.

While the sections 1' and 8' of FIGS. 13 and 14 have been illustrated, for the sake of clarity, as having contacts arranged as illustrated in FIGS. 4 and 5, it is obvious that any desired number of rows of fixed contacts can be provided on the strip $1^x$ of FIG. 13, and any desired number of rows of pairs of perforations can be provided in the strip $8^x$. Also, while in FIG. 13 I have illustrated the common conductor strips 5 and 5' as continuous, it would be, of course, a very simple matter to modify them by separating them into sections, as shown in FIG. 7, if this is desired for any particular application.

In FIG. 15, I have illustrated the basic pattern of fixed contacts on which the concept of the invention is founded. This pattern comprises the two parallel rows of fixed contacts 4 and 6, spaced apart, with a continuous common conductor strip 5 between them. This figure also illustrates the electrical connections for the outside circuits. These circuits are shown, by way of example, as selectively supplying current to banks of lamps 35 and 36. One side of the source of power is connected to lines 37, 38 and 39 which are joined to one side of the lamps, while the other side of the source of power is connected to the common conductor 5. Four movable spring contacts, similar to those shown in FIG. 6, are illustrated by shaded circles designated 10, 10ª, 10ᵇ and 10ᶜ. These are shown as bridging the upper row of contacts and the common conductor, and as the scanning plate moves longitudinally, current will be selectively supplied to the upper row of lamps 35. When the scanning plate is shifted laterally, as previously described, these movable contacts bridge the common conductor and the lower row of fixed contacts, thus selectively lighting the lower row of lamps 36.

In FIG. 16A, I have shown another example of how the invention can be used for controlling various groups of lamps or the like. In this figure, I have shown a continuous common conducting strip 5 connected with one side of a transformer or other source of power 41, and two rows of fixed contacts disposed one on each side of the common strip. These fixed contacts are shown as connected with one side of two series of lamps or the like, 43 and 44, the other side of these lamps being connected with a conductor 47 which is grounded as at 48. Thus FIG. 16A differs from FIG. 15, in that, instead of a complete metallic circuit being used for the lamps, one side of the lamps is grounded.

In FIG. 16B I have illustrated how, by only a very slight change in the pattern, a number of separate circuit arrangements can be handled by the same switch assembly. This slight change consists in breaking up the continuous common conducting strip into two or more isolated sections, and connecting them with separate sources of power. Two of these sections are shown at 5ª and 5ᵇ. The section 5ª is connected with one side of a transformer secondary 41ª, and the section 5ᵇ is connected with one side of a transformer secondary 41ᵇ, the other side of these secondaries being grounded as at 42ª and 42ᵇ. These transformer windings may, if desired, have different numbers of turns, and supply different voltages. Rows of fixed contacts 4ª and 4ᵇ are disposed on opposite sides of the section 5ª, and rows of fixed contacts 4′ and 4″ are located on opposite sides of the section 5ᵇ. Connected with the fixed contacts 4ª, by way of example, are a series of condensers 45, and connected with the contacts 4ᵇ, by way of another example, are a series of resistances 46, which may be of different values. Connected with the fixed contacts 4′ I have shown a series of lamps 43′, and connected with the contacts 4″ I have illustrated a series of any other desired devices 49. The other side of the lamps, condensers, resistances and other devices is grounded as indicated at 48ª, 48ᵇ, 48ᶜ and 48ᵈ, any desired instrumentalities to be controlled being of course included in the circuit. Depending upon the lateral position of the spring contacts 10 and 10ª, the switch will simultaneously control either the condensers 45 and lamps 43′ on the one hand, or the resistances 46 and devices 49 on the other.

In FIG. 17, I have illustrated, by way of another example, a board or panel 51 having a special pattern of fixed contacts mounted thereon. These contacts are formed by printed circuit technique, and the printed circuitry also provides linkages for suitably interconnecting many of these contacts, as shown, and flat terminals 54ª which are adapted for coupling to external circuits by means of edge connectors.

The diagram of FIG. 17 shows a group of three rows of fixed contacts 54 near the lower edge and two groups of two rows each, 57, near the middle and near the upper edge.

Adapted to cooperate with the board or panel 51 shown in FIG. 17 is the scanning plate 52, shown in FIG. 18. This plate is illustrated as formed of transparent material such as plastic and has mounted on the underside thereof three double ended or bow-shaped spring contacts 30, 30′ and 30″. The spring contact 30 is of the type shown in FIG. 23, and carries at its free ends pairs of double lobes 30ˣ and 30ʸ. The other two spring contacts 30′ and 30″ are of the type shown in FIG. 21 and have only a single lobe at each free end, as indicated at 30ʷ and 30ᶻ. Instead of employing common conductor strips connected together and to the source of current as is frequently done in other arrangements falling with the invention, the three spring contacts 30, 30′ and 30″ of FIG. 18 are joined together electrically, as by means of a wire 53. This interconnection permits the use of only two rows of fixed contacts in the middle and upper groups instead of three, as above mentioned, since it serves to distribute the current from the common conductor connected with one of the terminals 55, through spring contact 30, to the other spring contacts 30′ and 30″, thus eliminating the necessity for a common conductor in the middle and upper groups. One side of the source of power is connected to this flat terminal 55 at the right-hand end of the panel, while the other side of the source of power is connected to one side of the lamps. The other side of the lamps is connected to the other flat terminals communicating with various ones of the fixed contacts in the several different rows.

A board or panel with contacts arranged as shown in FIG. 17, with an opening 58 at the center of the panel, would be suitable for use in FIG. 10 where the operating shaft comes up from the bottom through an opening such as 58 in the board or panel.

In FIG. 17 I have adopted the expedient of illustrating the double lobe spring contacts by relatively large shaded circles, and the single lobe spring contacts by smaller circles. The diagram illustrates the position of the spring contacts corresponding with FIG. 18. With the spring contacts in this position, it will be seen that current from the terminal 55 is conveyed by means of the double lobe spring contact 30ʸ, which bridges two adjacent rows, to the terminal of a lamp marked a. At the same time, the double lobe contact 30ˣ will convey current from the terminal 55 through a string of connected fixed contacts to the lamp marked b. Simultaneously, the single lobe spring contacts 30ʷ and 30ᶻ will be supplied with power through the wire 53 on the scanning plate 52 and will illuminate two additional lamps marked a. Also simultaneously, the single lobe contacts 30ᵛ and 30ᵘ will be supplied with current through the wire 53 and will illuminate two other lamps marked b. Thus, in the position of the scanning plate shown in these two views, three lamps a and three lamps b will be simultaneously illuminated. The other lamps, shown in heavy lines, will not be lighted through the spring contacts 30, 30′ and 30″ while they are in the position shown, but may be lighted as the scanning plate moves either longitudinally or transversely. Similar groups of lamps are connected to the terminals 54ª at the left-hand end of the panel and will be controlled by other spring contacts on the scanning plate (not shown). Either single ended or double ended spring contacts with either single or double lobes can be employed in order to meet the requirements of the particular application and to cooperate as desired with the fixed contacts on the board or panel.

It will be understood that cams of various sizes may be used to cause the spring contacts on the scanning plate to successively engage as many fixed contacts as desired. In FIG. 19, I have illustrated, by way of example, a switching arrangement in which the spring contacts 10 are spaced apart a distance of six fixed contacts and a relatively large cam 13ᵇ is used to move the scanning plate the necessary distance to travel over the desired number of fixed contacts. In FIG. 20, on the other hand, I have illustrated a switch in which the spring contacts 10 are spaced apart a distance equal to only four fixed contacts, and in this case a smaller cam 13ᶜ would be used to cause the scanning plate to traverse a shorter distance.

It will thus be obvious that, using my basic pattern and stock strips such as illustrated in FIGS. 13 and 14, I may construct switches suitable for a large variety of applications, it only being necessary to employ different size cams to produce the desired throw or travel of the scanning plate in accordance with the number of steps or positions which is required.

Figure 8:
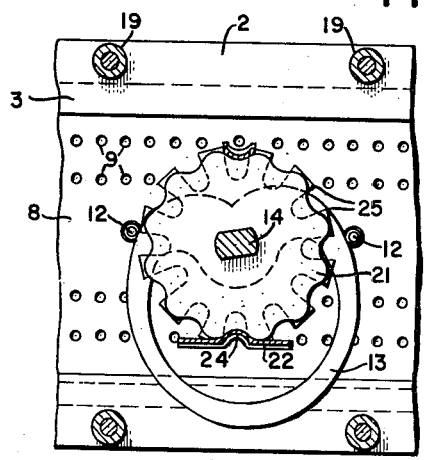
FIG. 8 is a horizontal section substantially on the line 8—8 of FIG. 2.
Figure 9:
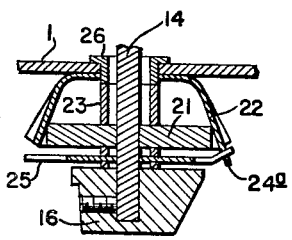
FIG. 9 is a fragmentary vertical section showing certain details of the detent mechanism hereinafter described.

If the switch is to be manually operated, it would also be necessary to employ detent discs such as 21 in FIGS. 8 and 9 having different numbers of notches in their edges, so that the scanning plate will be moved to corresponding numbers of positions, but if the operating shaft is motor driven and rotates continuously, the detent mechanism may be omitted, and in this case it would only be necessary to select the proper size of cam.

It will be understood that where in the claims I use the term "parallel rows of fixed contacts," I mean to include the common conductor strips, whether continuous as indicated in FIG. 15 or divided into sections as illustrated in FIG. 7, and where I use the term "rectangular path" I mean to include any of the shapes of paths shown in FIGS. 24–27, inclusive.

What I claim is:

1. A selector switch comprising a rigid supporting member having thereon a pair of parallel rows of fixed contacts, a scanning plate, means spacedly mounting said plate for movement parallel with said member, a movable spring contact carried by said scanning plate and arranged to travel over and engage said fixed contacts, and means compelling said scanning plate to move in sequence, first in one direction, longitudinally of said rows, so that said spring contact successively engages the fixed contacts of one row, then laterally of said rows so as to bring said spring contact into registry with the other row, and then longitudinally of said rows in the opposite direction so as to cause said spring contact to successively engage the fixed contacts of said other row during one complete cycle of operation.

2. A selector switch comprising a rigid supporting member having thereon a pair of parallel rows of fixed contacts, a scanning plate, means spacedly mounting said plate for movement parallel with said member, a movable spring contact carried by said scanning plate and arranged to travel over and engage said fixed contacts, and means compelling said scanning plate to move in such manner as to cause said spring contact to describe a rectangular path only, during one portion of which it successively engages the fixed contacts of one row and during another portion of which it successively engages the fixed contacts of the other row, said mechanism comprising means for preventing said scanning plate from moving in any other way.

3. A selector switch comprising a rigid support having thereon a pair of parallel rows of fixed contacts, a scanning plate, means spacedly mounting said plate for movement in a direction parallel with said support, a spring contact carried by said plate and so located as to travel over and engage said rows of fixed contacts, a rotary shaft, and means operated by said shaft as it rotates in the same direction for moving said scanning plate back and forth longitudinally of said rows and for periodically shifting said scanning plate laterally so as to cause said spring contact to engage successively the fixed contacts of one row, and then the fixed contacts of the other row.

4. A selector switch comprising a rigid support having thereon a pair of parallel rows of fixed contacts with a conducting element between them, a scanning plate, means spacedly mounting said plate for movement in a direction parallel with said support, a spring contact carried by said plate and so located as to travel over and engage said rows of fixed contacts, said spring contact being constructed to engage and bridge the fixed contacts of one row and the adjacent conducting element, a rotary shaft, and means operated by said shaft as it rotates in the same direction for moving said scanning plate and spring contact back and forth longitudinally of said rows, and for periodically shifting said spring contact from a position in which it engages and bridges the elements of one outside row of fixed contacts and said conducting element, to a position in which it engages and bridges the elements of the other outside row and said conducting element.

5. A selector switch comprising a flat, rectangular support having thereon a plurality of conducting elements, and a rectangular scanning plate, means spacedly mounting said plate for movement in a plane parallel with said support, a plurality of spring contacts mounted on said scanning plate and bearing against the conducting elements on said support, said spring contacts being interposed between said support and scanning plate and serving to resiliently separate them, and means acting against the tension of said spring contacts for limiting the extent of such separation, said means comprising guide rails disposed at the side edges of said support and having inwardly projecting flanges overlying the scanning plate, said scanning plate being substantially narrower than the distance between said guide rails, so that it may move transversely as well as longitudinally.

6. A selector switch comprising a flat support having thereon a plurality of conducting elements, and a scanning plate, means mounting said plate for movement in a plane parallel with but spaced from said support, and carrying a spring contact constructed and positioned to engage said conducting elements, a rotary shaft disposed at right angles to said plate and having a constant width cam mounted thereon, adjacent said plate, and a pair of follower pins set in said plate and engaging the edge of said cam, whereby, as said shaft is rotated, movement is imparted to said plate.

7. A selector switch comprising a flat support having thereon a plurality of conducting elements, and a scanning plate, means mounting said plate for movement in a plane parallel with but spaced from said support, and carrying a spring contact in engagement with said conducting elements, a rotary shaft disposed at right angles to said plate and having a constant width cam mounted thereon adjacent said plate, a pair of follower pins set in said plate and engaging the edge of said cam, and means for causing the movement of said plate produced by said cam to follow a predetermined path, said means including a fixed member having therein a slot having parallel sides and arcuate ends, and a guide pin set into said plate and engaging the edges of said slot.

8. A selector switch comprising a flat support having thereon a plurality of conducting elements, and a scanning plate, means mounting said plate for movement in a plane parallel with but spaced from said support, and carrying a spring contact in engagement with said conducting elements, a rotary shaft disposed at right angles to said plate and connected with said plate to move the same, and a detent mechanism associated with said shaft for resiliently holding it in any position to which it may be turned, said mechanism comprising a notched disc secured to said shaft, and a fixed spring member constructed and positioned to engage the notches in said disc.

9. In a selector switch, a fixed support having thereon a pair of adjacent conducting elements, a scanning plate, means mounting said plate for movement in a plane parallel with but spaced from said support and carrying a spring contact, the free end of said contact comprising a pair of integrally connected lobes of such a combined width as to simultaneously engage and bridge said conducting elements, and the portion of said contact adjacent said lobes being in the form of a relatively narrow neck.

10. A selector switch comprising a rigid supporting member having thereon a pair of parallel rows of fixed contacts, a scanning plate, means mounting said plate for movement parallel with said member, a movable spring contact carried by said scanning plate and arranged to travel over and engage said fixed contacts, means moving said scanning plate in such manner as to cause said spring contact to describe a rectangular path, and selective stop means for interrupting the movement of said spring contact after it has traversed any desired part of said path.

References Cited by the Examiner

UNITED STATES PATENTS

| | | |
|---|---|---|
| 1,245,467 | 11/17 | Kingsbury. |
| 2,130,153 | 9/38 | Plenser. |
| 2,495,702 | 1/50 | Deakin _____ 200—16 |
| 2,557,480 | 6/51 | Snyder _____ 200—16 |
| 2,624,820 | 1/53 | Payette _____ 200—166 |
| 2,641,050 | 6/53 | Gambill et al. _____ 29—155 |
| 2,666,253 | 1/54 | Morberg _____ 29—155 |
| 2,680,174 | 6/54 | Foley et al. _____ 200—166 |
| 2,742,537 | 4/56 | Leslie. |
| 2,761,041 | 8/56 | Yarrick _____ 200—153 |
| 2,810,795 | 10/57 | Hartsock _____ 200—14 |
| 2,814,680 | 11/57 | Sherrick _____ 200—16 |
| 2,931,866 | 4/60 | Brown _____ 200—16 |
| 2,933,566 | 4/60 | Miller et al. _____ 200—16 |
| 2,943,158 | 6/60 | Dubeau _____ 200—153 X |
| 3,030,459 | 8/62 | Elliott et al. _____ 200—16 X |

FOREIGN PATENTS 329,243  9/35  Italy.

BERNARD A. GILHEANY, *Primary Examiner.*

MAX L. LEVY, *Examiner.*